United States Patent [19]

Seo

[11] Patent Number: 4,658,928

[45] Date of Patent: Apr. 21, 1987

[54] METAL SENSING APPARATUS FOR USE IN OPERABLE TOYS

[75] Inventor: Soo C. Seo, Seoul, Rep. of Korea

[73] Assignee: Samsung Co., Ltd., Seoul, Rep. of Korea

[21] Appl. No.: 768,361

[22] Filed: Aug. 22, 1985

[30] Foreign Application Priority Data

Aug. 22, 1984 [KR] Rep. of Korea .................... 84-5055

[51] Int. Cl.$^4$ .................. B62D 1/24; A63H 18/00
[52] U.S. Cl. ..................................... 180/168; 180/6.5;
318/139; 318/587; 446/129; 446/444; 446/454
[58] Field of Search ............... 446/444, 445, 175, 454,
446/455, 129; 180/6.5, 131, 148, 168; 318/139, 587

[56] References Cited

U.S. PATENT DOCUMENTS

| | | | |
|---|---|---|---|
| 3,008,532 | 11/1961 | Reed | 318/587 X |
| 3,035,554 | 6/1962 | Hosking et al. | 180/168 |
| 3,043,952 | 7/1962 | Reid | 180/168 |
| 3,085,646 | 4/1963 | Paufve | 180/168 |
| 3,130,803 | 4/1964 | Wiggins | 446/175 |
| 3,327,796 | 6/1967 | Hanmer | 446/444 |
| 3,468,391 | 9/1969 | Rushing et al. | 180/168 |
| 3,736,484 | 5/1973 | Reynolds | 318/587 |
| 4,152,867 | 5/1979 | Ogawa | 446/445 |
| 4,207,502 | 6/1980 | Omura | 318/587 X |

Primary Examiner—F. Barry Shay

[57] ABSTRACT

An operable toy utilizes a metal sensing apparatus which includes a tuned circuit which includes a pick-up coil. The resonance frequency of the resonance circuit shifts when the pick-up coil senses a metal or magnetic object. A motor is normally driven in the absence of the sensing of a metal or magnetic object. When the metal or magnetic object is sensed, the frequency shift of the tuned circuit including the pick-up coil attenuates the frequency produced by an oscillator and as the voltage of the signal produced by the oscillator is attenuated, a level detection circuit produces a low output to thereby disconnect the power from the motor. Alternatively, the power to the motor may be reversed. Two metal sensing apparatuses may be utilized in an operable toy to cause the toy to follow a track of metallic or magnetic material.

11 Claims, 6 Drawing Figures

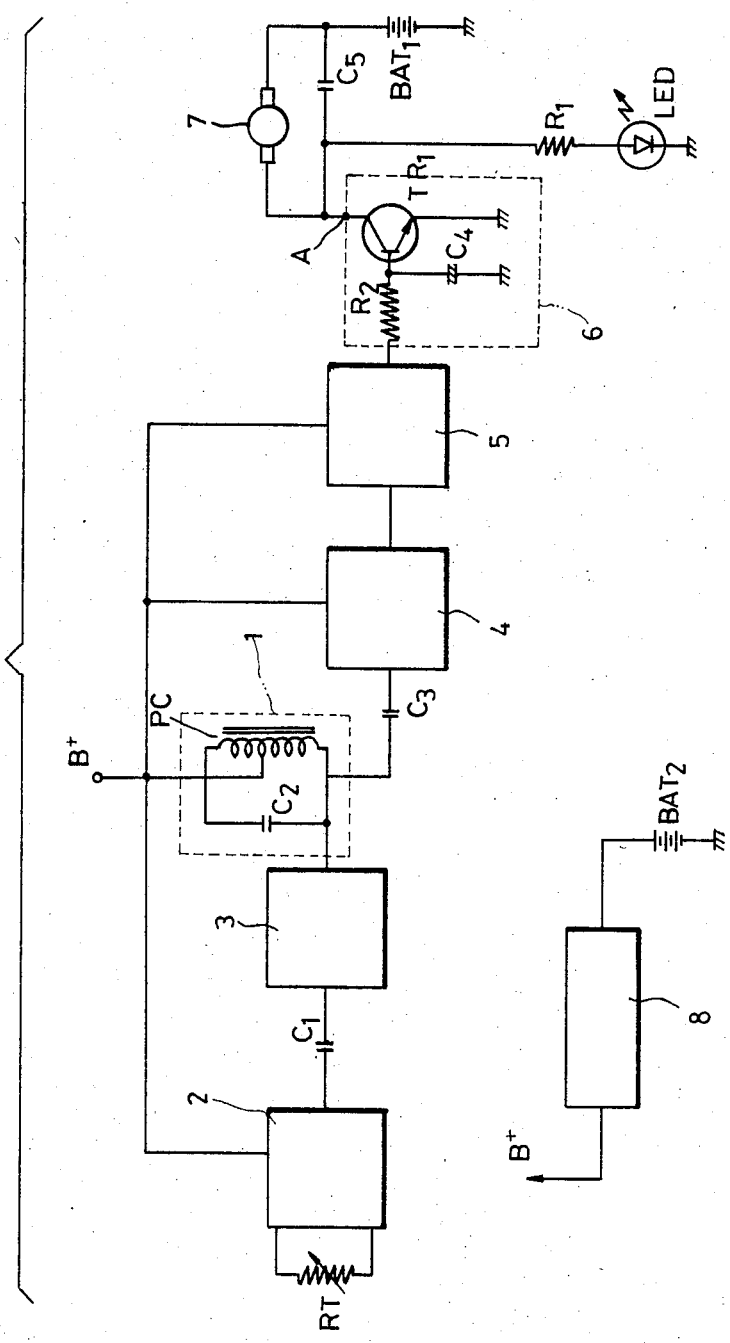
F I G. 1

METAL SENSING APPARATUS FOR USE IN OPERABLE TOYS

FIELD OF THE INVENTION

The present invention relates to mobile toys and metal sensing apparatus for use therein, and in particular, to mobile toys containing a metal sensing apparatus for controlling the application of power to small drive motors used to drive the toy across a surface with wheels or the like.

BACKGROUND OF THE INVENTION

Throughout history, various kinds of toys have been designed in order to stimulate children's intelligence as well as their mental and physical development. For example, there are animal toys, ornamental toys, intellectual games and the like and mobile toys of an automatic or controllable nature. In the past, one of the more popular types of toys is the mobile toy driven by electric power such as electrically driven toy trucks, cars, or the like. These mobile or operable toys includes those which automatically move about within a restricted area and those which are controlled by remote control through the use of wired or wireless controls. Those toys which automatically move about in a restricted area, the so-called automatic toys, have a disadvantage in that their controls are simple and thus afford children a limited opportunity to control such toys. Further, such toys do not effectively develop a child's I.Q. and imagination. While remote control toys allow more sophisticated control by a child, and may be controlled by the child in any desired direction, these toys generally need a relatively large playing space and thus may not be suitable for many households.

In addition to these automatic and remote controllable toys, there are also wheeled vehicles and other mobile toys designed to follow a track. The disadvantage of these toys is that it is often difficult to set up the track and a large number of different track elements are required to construct various desired paths for the toy.

OBJECTS AND SUMMARY OF THE INVENTION

It is an object of the present invention to provide an operable toy having a metal sensing apparatus for sensing magnetic or metallic materials and for controllably moving in response to the interaction therewith;

It is another object of the present invention to provide an operable toy having a pick-up coil which monitors the presence of a sensed metallic or magnetic material, for example, a line, or chain type product and controls a motor to maintain a predetermined distance from sensed material;

It is stil a further object of the present invention to provide an operable toy having two motors and two metal sensing circuits which operates in response to the type of magnetic or metallic material sensed.

These objects are accomplished by virtue of the present invention's utilization of a metal sensing apparatus in an operable toy. The metal sensing apparatus includes a tuned circuit including a condenser and pick-up coil to which an oscillator applies a frequency signal. A voltage detector monitors the output of the tuned circuit which exhibits an output signal variation upon detection of a metallic or magnetic object. The output of the voltage detector is discriminated by a level detecting circuit which in turn controls the operation of a drive motor of the toy so as to move the toy to locate it a predetermined distance from the metallic object.

BRIEF DESCRIPTION OF THE DRAWINGS

The above mentioned objects as well as the advantages of the present invention will be made clear from the following description of the preferred embodiments of the system of the present invention with reference to the accompanying drawings, wherein:

FIG. 1 is a schematic diagram of one form of metal sensing circuit employed in the present invention;

DETAILED DESCRIPTION OF THE INVENTION

Figure 2:
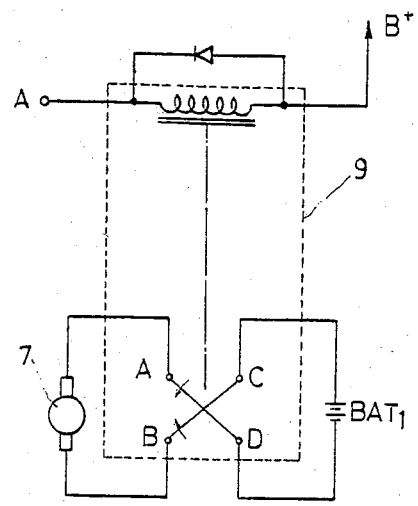
FIG. 2 is a schematic diagram of another form of motor driving circuit employed in a toy according to the teachings of the present invention.

Referring to FIG. 1, the circuitry of the metal detecting apparatus of the present invention is illustrated. A tuned circuit 1 including a condenser $C_2$ and a pick-up coil PC is connected between a source of battery voltage B+ and an alternating voltage detector 4. The junction between the tuned circuit 1 and the alternating voltage detector 4 is also connected to a tuning amplifier 3 which supplies an AC voltage derived from a reference frequency oscillator 2. The alternating voltage detector 4 is in turn connected to a level detecting circuit 5 which is connected to a DC amplifier 6. The DC amplifier 6 is used to control the application of battery power from battery BAT, to a DC electric motor 7. A voltage regulator 8 is utilized to maintain the battery voltage supplied to the circuit of FIG. 1 at a relatively constant level.

An operable toy utilizing the metal sensing apparatus of the present invention as shown in FIG. 1 may be controlled by a user remotely and freely. When the operating toy approaches a metallic or magnetic object, the metal sensing apparatus enables operation of the toy to begin.

A coin, a chain or a wire line type product or other metallic or magnetic object may be used to control the operation of a toy utilizing the metal sensing apparatus of FIG. 1. Such products can be made of magnetic materials (Fe, Ni) non-magnetic materials (Zn, Ag, Al), a ferrite core of magnetic and alloy material magnetics and alloys, or the like. When the pick-up coil PC of the metal sensing apparatus of the present invention approaches one of these sensed object materials 10 at a predetermined distance, the motor 7 is driven by application of power therethrough through conduction of transistor TR1 of the DC amplifier 6. The tuned circuit 1 includes pick-up coil PC and condenser $C_2$ connected to form a resonance LC circuit, with a natural frequency fr corresponding to the frequency of the frequency oscillator 2. When the natural frequency fr determined by the pick-up coil PC and condenser $C_2$ corresponds with the reference frequency, the current through the resonance circuit increases to a maximum. This resonance frequency is defined as $$f_0 = \frac{1}{2\pi\sqrt{LC}}.$$

Figure 3A:
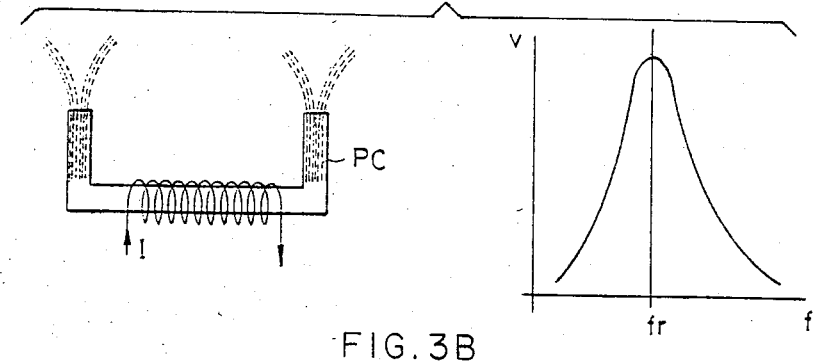
FIG. 3 is a diagrammatic explanation of the operation of the pick-up coil utilized according to the teachings of the present invention.
Figure 3B:
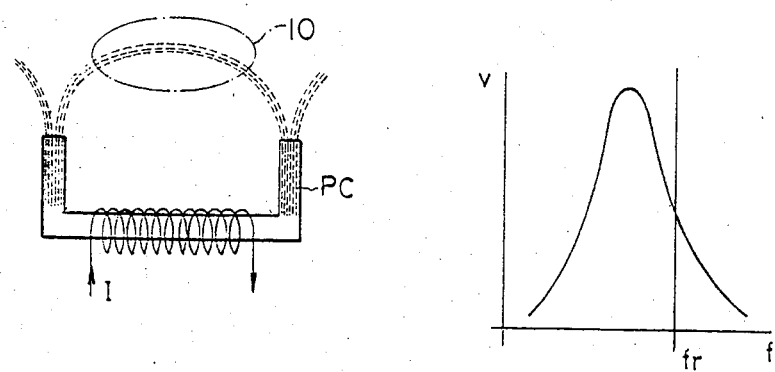

FIG. 3 relates the characteristics of the tuned circuit to the presence of a sensed object material in the proximity of the pick-up coil PC. As can be seen from FIG. 3, the current through the resonance circuit sharply drops as the frequency shifts away from the resonance frequency. When the pick-up coil PC approaches near a sensed object material 10, the inductance of the pick-up coil PC is varied to change the resonance frequency of the tuned circuit 1. Thus, as can be seen in FIG. 3-2, the output voltage of a tuned amplifier 3 decreases as the resonance frequency varies in response to the proximity of the sensed object material. In the absence of such a sensed object material, there is no variation in the frequency or voltage within the tuned circuit. Thus, the voltage and current of the pick-up coil are maximized. The level detecting circuit 5 senses this variation in the output voltage of the resonance circuit and in turn, in the alternating voltage detector 4, and develops a logical high or logical low state in response thereto to thereby control operation of the motor 7.

The voltage from the battery BAT2 supplies each circuit with a stable voltage B+ through the voltage regulator 8. The reference frequency oscillator 2 has a frequency tunable through the use of variable resistor RT. The tuning amplifier 3 consists of a resistor, condenser, transistor, and timer IC.

The frequency generated by the oscillator 2 is used to drive the tuning amplifier 3 through a condenser $C_1$. The output signal of the tuning amplifier 3, an amplification of the frequency produced by the oscillator 2, is used to drive the tuned circuit.

During operation of the metal detecting circuit of the present invention, the resonance frequency of the oscillator varies the voltage of the frequency signal developed by the oscillator 2 and applied to the voltage detector 4 through condenser $C_3$. As the pick-up coil PC approaches the sensed object material 10, the voltage applied to the voltage detector 4 decreases. The alternating voltage detector 4 rectifies the value of the alternating voltage applied thereto from the tuned circuit 1 and drives the level detecting circuit 5 with this rectified DC voltage.

When the pick-up coil PC approaches near the sensed object material 10, the output voltage of the tuned circuit 1 decreases to a relatively low level. Thus, the output of the alternating voltage detector 4 is below the threshold of the level detecting element 5 and the level detecting element 5 produces a logically low signal. This logically low signal applied to the DC amplifier 6 is insufficient to cause the transistor TR1 to conduct. Therefore, the battery power is not supplied across the motor 7 and the motor is stopped. The OFF state of the motor is signaled by the illumination of the LED signalling that the motor is off.

On the other hand, when the pick-up coil PC is far from the sensed object material 10, the output voltage of the tuned circuit 1 is at its maximum as the resonant frequency of the tuned circuit 1 is not shifted. Thus, a relatively high voltage is applied to the alternating voltage detector 4 which produces a DC voltage above the threshold of the level detecting circuit 5. The level detecting circuit 5 thus produces a logical high signal which is sufficient to cause transistor TR1 to conduct, thereby driving the motor while turning the LED off.

From the above explanation, it is clear that the forward rotation and stop functions of the motor 7 are controlled in response to proximity of sensed object material. This metal sensing apparatus may be used to operate operable toys and the like as will be hereinafter described.

FIG. 2 illustrates a portion of an alternative embodiment of the present invention which replaces the motor drive circuitry of FIG. 1 connected to the collector of transistor TR1 of the DC amplifier 6 (point A). By substituting the FIG. 2 circuitry for the motor drive circuitry of FIG. 1, the metal sensing apparatus of the present invention is used to reverse the motor direction upon detection of a sensed metal object. When there is no sensed metal object detected, the output of the level detecting circuit 5 is high, thus causing the transistor TR1 of the amplifier 6 to conduct to actuate the relay 9 connecting contacts A to C and B to D. Therefore, as the battery BAT1 supplies the motor 7 with voltage, the motor rotates in the forward direction. When a sensed object material 10 is detected, the output of the level detecting circuit 5 goes low and thus the transistor TR1 of amplifier 6 is non-conductive. Therefore, contact A is connected to contact D and contact C is connected to contact B to return the relay to its normal state. Therefore, the motor 7 has a reverse voltage applied thereto from the battery BAT1 to reverse the motor's direction. Consequently, in the embodiment of FIG. 2, as the pick-up coil PC in the toy approaches a sensed object material 10, motor rotation is reversed to back the toy away from the object.

Figure 4:
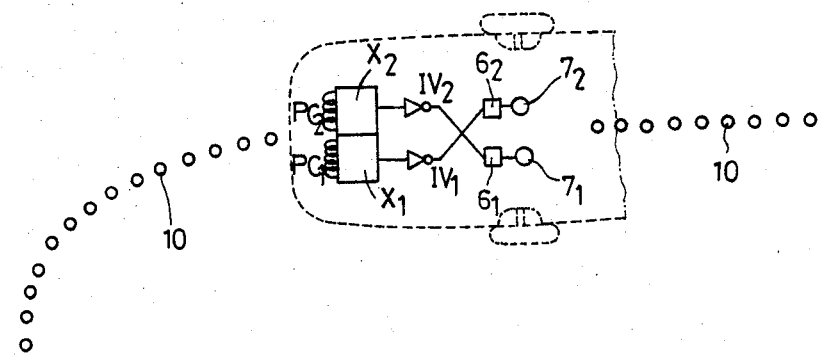
FIG. 4 is a view of one form of a practical application of the metal sensing apparatus in an operable toy according to the teachings of the present invention.
Figure 5:
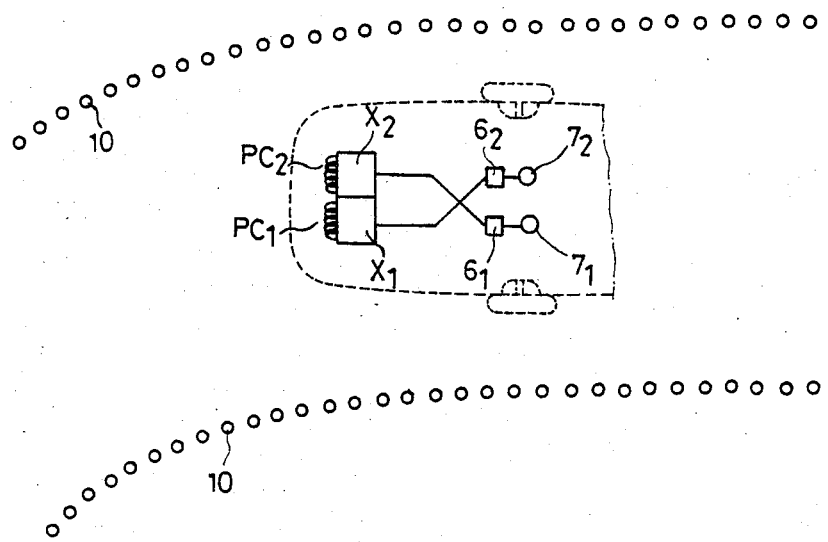
FIG. 5 is a view of another form of a practical application of the use of the metal sensing apparatus of the present invention in an operable wheeled toy.

In the embodiments of FIGS. 4 and 5, two metal sensing circuits constructed according to the teachings of the present invention are installed in operable toys to operate in parallel and independently control opposing drive wheels. In the embodiment of FIG. 4, the operable toy follows a track of sensed object material 10 which may be a chain or the like. If the toy varies from the track, either the left pick-up coil PC1 or the right pick-up coil PC2 senses the absence of the sensed material 10. Thus, either motor $7_1$ or $7_2$ is placed in a stop state causing the direction of movement of the operable toy to vary to return to the track of sensed material. In order to function in this manner, inverters IV1 and IV2 are interposed between the first metal sensing circuit $X_1$ and the second metal sensing circuit $X_2$ and their respective DC amplifiers $6_2$, $6_1$. The metal sensing circuits $X_1$, $X_2$ correspond to the portion of the metal sensing apparatus of FIG. 1 before the DC amplifier 6. Due to the inverters IV1, IV2, when one of the metal sensing circuits, for example, the first metal sensing circuit $X_1$ and its associated pick-up coil PC1 move away from the track of sensed object material 10, a high signal is developed which is in turn applied to the inverter IV1, causing the DC amplifier $6_2$ to be non-conductive and momentarily stopping the DC motor $7_2$. As the motor $7_1$ driving the opposing drive wheel continues to rotate, the toy swings back towards the sensed object material track 10 and the coil PC1 again begins to sense this track to again drive the motor $7_2$. Thus, the operable toy of FIG. 4 will follow the track of sensed object material as described above. When the operable toy of FIG. 4 completes its traversal of the track of sensed object material 10, so that neither coil PC1 or PC2 senses the presence of such sensed object material, both motors $7_1$ and $7_2$ will be disconnected from the battery power supply to thereby stop the operable toy.

FIG. 5 shows another embodiment of the metal sensing apparatus of the present invention in an alternative embodiment of an operable toy. According to this embodiment, the sensed object material is laid on either side of the operable toy to form a track arranged on both sides of the operable toy. When the operable toy moves near the sensed object material, for example, towards the upper track of sensed object material in FIG. 5, one of the pick-up coils, for example, the right pick-up coil PC2 senses the presence of this sensed object material. This produces a low output of the second metal sensing circuit $X_2$ which therefore causes the first DC amplifier $6_1$ to disconnect the supply of power from the motor $7_1$ to thereby stop the rotation of the left drive wheel. The operable toy of the FIG. 5 embodiment thereby swings back into the track until the second pick-up coil PC2 no longer senses the sensed object material. Similarly, if the pick-up coil PC1 senses the leftmost portion of the track 10, the right motor and wheel will stop rotation to swing the operable toy back into the track. Therefore, as long as neither coil senses the sensed object material 10, the toy will continue to move within the track. When one of the coils senses the sensed object material defining the track, the operable toy will swing into the track to continue its movement therealong.

Instead of using the sensed object material 10 to form a track such a shown in FIG. 5, the material may be utilized to form a ring or arena for operation of the operable toy. The operable toy will move in this ring or arena until one of the pick-up coils PC1, PC2 senses the sensed object material to turn the operable toy back into the arena. However, if both pick-up coils PC1, PC2 simultaneously sense the presence of the sensed object mterial 10, the operable toy will simply stop and refuse to leave the arena.

The sensed object material 10 of the present invention may be formed of a number of products to make suitable barriers for use in the embodiments of FIGS. 4 and 5. In accordance with the present invention, the interaction of the pick-up coils of the metal sensing apparatus of the present invention and the barriers controls the motors of the device to cause the device to stop, rotate right or left. Therefore, the operable toy of the present invention may be played with in a relatively small space controllable according to the type of barrier used.

As can be seen from the foregoing description, the operable toy and the metal sensing apparatus used therein may be employed in a number of manners. Various modifications of the present invention may be made without departing from the spirit and scope thereof. The scope of the present invention is solely defined by the claims appended hereto.

What is claimed is:

1. A metal sensing system for use in operable toys comprising:
    means for sensing the proximity of a metallic or magnetic object material, said means including a tuned circuit including a pick-up coil, said tuned circuit having a resonance frequency, said resonance frequency shifting when a sensed object material is disposed adjacent said pick-up coil;
    oscillator means, operatively connected to said tuned circuit, for developing an oscillation signal at said resonance frequency;
    alternating voltage level detector means, operatively connected to said tuned circuit, for monitoring the output thereof and developing an output signal if the output of said tuned circuit is higher than a predetermined value;
    said tuned circuit attenuating said oscillation signal to form an output signal of relatively low voltage when said pick-up coil is disposed adjacent a magnetic or metallic sensed object material;
    said alternating voltage level detector means developing a low voltage output when said oscillation is attenuated and otherwise developing a high voltage output;
    a motor;
    motor drive means, responsive to said alternating voltage level detector means for driving said motor in a forward direction only when a said high voltage output is developed by said alternating voltage level detector means.

2. The system of claim 1 wherein said alternating voltage level detector means includes
    alternating voltage detector means for rectifying said oscillation signal to develop a d.c. voltage related to the level of said oscillation signal; and
    level detection circuit means for developing said high voltage output if said d.c. voltage is above a predetermined threshold and developing a low voltage output if said d.c. voltage is not above said predetermined threshold.

3. The system of claim 1 wherein said tuned circuit includes a condenser.

4. The system of claim 1 wherein said motor drive means does not drive said motor when said low voltage output is developed by said alternating voltage level detector means to stop said motor.

5. The system of claim 1 wherein said motor drive means drives said motor in a reverse direction when said low voltage output is developed by said alternating voltage level detector means.

6. The system of claim 5 wherein said motor drive means includes;
    a relay reversing the voltage applied to said motor upon receipt of said high voltage signal from said alternating voltage level detector means.

7. An operable toy comprising:
    first and second drive wheels;
    first and second metal sensing circuits each including:
    means for sensing the proximity of a metallic or magnetic object material, said means including a tuned circuit including a pick-up coil, said tuned circuit having a resonance frequency, said resonance frequency shifting when a sensed object material is disposed adjacent said pick-up coil,
    oscillator means, operatively connected to said tuned circuit, for developing an oscillation signal at said resonance frequency,
    alternating voltage level detector means, operatively connected to said tuned circuit, for monitoring the output thereof and developing an output signal if the output of said tuned circuit is higher than a predetermined value,
    said tuned circuit attenuating said oscillation signal to form an output signal of relatively low voltage when said pick-up coil is disposed adjacent a magnetic or metallic sensed object material,
    said alternating voltage level detector means developing a low voltage output when said oscillation is attenuated and otherwise developing a high voltage output, a motor connected to one of said drive wheels, motor drive means, responsive to said alternating voltage level detector means for driving said motor in a forward direction only when a said high voltage output is developed by said alternating voltage level detector means; and a metallic or magnetic object material track disposed on a play surface;

said first and second sensing circuits driving said first and second drive wheels to drive said toy and follow said track.

8. The toy of claim 7 wherein said pick-up coils of said first and second metal sensing circuits are adjacently disposed on said toy, the said motor of each said sensing circuit being driven only when said track is sensed by an associated said pick-up coil.

9. The toy of claim 7 wherein said pick-up coils of said first and second metal sensing circuits are adjacently disposed on said toy, the said motor of each said sensing circuit being driven when said track is not sensed by an associated said pick-up coil.

10. The toy of claim 7 wherein said sensed object material track is formed of a magnetic material or metal.

11. The toy of claim 10 wherein said track is a chain, wire or a row of discrete pieces.

* * * * *